(12) United States Patent
D'Zmura

(10) Patent No.: US 7,357,638 B2
(45) Date of Patent: Apr. 15, 2008

(54) ASTROLOGICAL HOROSCOPES

(76) Inventor: David Andrew D'Zmura, P.O. Box 621, Indio, CA (US) 92201-0621

( * ) Notice: Subject to any disclaimer, the term of this patent is extended or adjusted under 35 U.S.C. 154(b) by 8 days.

(21) Appl. No.: 11/455,901

(22) Filed: Jun. 19, 2006

(65) Prior Publication Data

US 2006/0281055 A1    Dec. 14, 2006

Related U.S. Application Data

(60) Division of application No. 11/013,275, filed on Dec. 15, 2004, now Pat. No. 7,083,415, which is a division of application No. 10/671,415, filed on Sep. 25, 2003, now Pat. No. 6,974,324, which is a division of application No. 09/849,582, filed on May 5, 2001, now Pat. No. 6,776,618, which is a continuation of application No. PCT/US00/28838, filed on Oct. 18, 2000, and a continuation of application No. 09/421,192, filed on Oct. 18, 1999, now abandoned, which is a continuation of application No. PCT/US98/13383, filed on Jun. 26, 1998, and a continuation of application No. 08/883,753, filed on Jun. 27, 1997, now abandoned, application No. 11/455,901, filed on Jun. 19, 2006.

(60) Provisional application No. 60/695,027, filed on Jun. 29, 2005, provisional application No. 60/212,694, filed on Jun. 19, 2000, provisional application No. 60/208,580, filed on Jun. 2, 2000, provisional application No. 60/207,450, filed on May 30, 2000, provisional application No. 60/207,415, filed on May 30, 2000, provisional application No. 60/207,310, filed on May 30, 2000, provisional application No. 60/206,603, filed on May 25, 2000, provisional application No. 60/206,536, filed on May 21, 2000, provisional application No. 60/205,290, filed on May 19, 2000, provisional application No. 60/202,038, filed on May 5, 2000, provisional application No. 60/189,332, filed on Mar. 14, 2000, provisional application No. 60/181,502, filed on Feb. 10, 2000, provisional application No. 60/172,651, filed on Dec. 20, 1999, provisional application No. 60/158,065, filed on Oct. 7, 1999, provisional application No. 60/144,056, filed on Jul. 16, 1999, provisional application No. 60/040,442, filed on Mar. 12, 1997.

(51) Int. Cl.
*G09B 19/00* (2006.01)
(52) U.S. Cl. .................................... 434/106
(58) Field of Classification Search ............... 434/106; 273/161, 302, 304, 308
See application file for complete search history.

(56) References Cited

U.S. PATENT DOCUMENTS 4,711,632 A * 12/1987 Detrick ........................ 434/106

(Continued)

*Primary Examiner*—Kurt Fernstrom

(57) ABSTRACT

The invention provides a zodiac sign horoscope mapping device, locating the coordinate positions of the twelve zodiac signs, in a manner accurately reflecting the precession of the equinoxes. The device divides the ecliptic coordinate sphere into twelve uniform longitudinal arcs, aligning an origin by a zodiac sign to degree, and thereby locating the twelve zodiac signs along the sphere. A dependent device divides the ecliptic coordinate sphere into twelve non-uniform arcs, each arc isomorphic to the longitudinal span of one of the twelve traditional zodiac constellations, and thereby locating each zodiac sign as isomorphic to its named constellation. The invention provides an astrological horoscope device, which provides the calendar dates of the year for each zodiac Sun sign. The invention provides a horoscope generating method, which can comprise a horoscope computer program's functional specification. The invention provides a horoscope generating computer program.

4 Claims, 14 Drawing Sheets

U.S. PATENT DOCUMENTS 5,516,289 A * 5/1996 Quigley et al. .............. 434/106
5,775,695 A * 7/1998 Byers .......................... 273/161
6,015,295 A * 1/2000 Winks, Jr. ................... 434/106
6,108,277 A * 8/2000 Whitmore .................... 368/15

* cited by examiner

Figure 3A

| | |
|---|---|
| Birth Sun Aspected by Horoscope:<br>Sun, Mercury, Venus, Mars, Jupiter, Saturn, Uranus, Neptune, Pluto, Moon | Birth Mercury Aspected by Horoscope:<br>Sun, Mercury, Venus, Mars, Jupiter, Saturn, Uranus, Neptune, Pluto, Moon |
| Birth Venus Aspected by Horoscope:<br>Sun, Mercury, Venus, Mars, Jupiter, Saturn, Uranus, Neptune, Pluto, Moon | Birth Mars Aspected by Horoscope:<br>Sun, Mercury, Venus, Mars, Jupiter, Saturn, Uranus, Neptune, Pluto, Moon |
| Birth Jupiter Aspected by Horoscope:<br>Sun, Mercury, Venus, Mars, Jupiter, Saturn, Uranus, Neptune, Pluto, Moon | Birth Saturn Aspected by Horoscope:<br>Sun, Mercury, Venus, Mars, Jupiter, Saturn, Uranus, Neptune, Pluto, Moon |
| Birth Uranus Aspected by Horoscope:<br>Sun, Mercury, Venus, Mars, Jupiter, Saturn, Uranus, Neptune, Pluto, Moon | Birth Neptune Aspected by Horoscope:<br>Sun, Mercury, Venus, Mars, Jupiter, Saturn, Uranus, Neptune, Pluto, Moon |
| Birth Pluto Aspected by Horoscope:<br>Sun, Mercury, Venus, Mars, Jupiter, Saturn, Uranus, Neptune, Pluto, Moon | Birth Moon Aspected by Horoscope:<br>Sun, Mercury, Venus, Mars, Jupiter, Saturn, Uranus, Neptune, Pluto, Moon |

Time Convention: convert Birth Date and Horoscope Date to Julian Date

---

Ephemeris Generator to calculate Birth and Horoscope Date Position Sets:

based on Julian Date convention;

positions in ecliptic coordinates of celestial longitude/latitude;

date data sets of each planet in degrees longitude;

ecliptic system convention of vernal equinox origin;

planet positions calculated with standard astronomy algorithms;

accuracy of positions for astrology to within one degree.

---

Relations of Lunar Animal Signs to Zodiac Signs, to Degrees Longitude:

Rat: Year 1960: 11 PM to 1 AM: Scorpio: Longitude 240 to 270 degrees;

Ox: Year 1961: 1 AM to 3 AM : Sagittarius: Longitude 270 to 300 degrees;

Tiger: Year 1962: 3 AM to 5 AM : Capricorn: Longitude 300 to 330 degrees;

Rabbit: Year 1963: 5 AM to 7 AM: Aquarius: Longitude 330 to 360/0 degrees;

Dragon: Year 1964: 7 AM to 9 AM: Pisces: Longitude 0 to 30 degrees;

Snake: Year 1965: 9 AM to 11 AM: Aries: Longitude 30 to 60 degrees;

Horse: Year 1966: 11 AM to 1 PM: Taurus: Longiutde 60 to 90 degrees;

Sheep: Year 1967: 1 PM to 3 PM: Gemini: Longitude 90 to 120 degrees;

Monkey: Year 1968: 3 PM to 5 PM: Cancer: Longitude 120 to 150 degrees;

Rooster: Year 1969: 5 PM to 7 PM: Leo: Longitude 150 to 180 degrees;

Dog: Year 1970: 7 PM to 9 PM: Virgo: Longitude 180 to 210 degrees;

Pig: Year 1971: 9 PM to 11 PM: Libra: Longitude 210 to 240 degrees.

Note: (Year +/- 12 (and multiples thereof)) gives same set of Animal Data.

Figure 5

Aspects calculated utilizing if/elseif/else commands - sample code:

A= set of Birth Date positions, comprising data to degree of 360 for ten planets
a = set of Horoscope Date positions, being data to degree of 360 for ten planets
Set = [ Sun Mercury Venus Mars Jupiter Saturn Uranus Neptune Pluto Moon ]

example:       A = [ 344 170 225 70 254 281 105 165 340 15 ]
               a = [ 23 190 45 342 212 309 247 98 119 350 ]

if (a(1,1) - 8) <= A(1,1) & A(1,1) <= (a(1,1) + 8)
               'interpretation conjunction sun and sun'
elseif ((a(1,1) - 180) - 8) <= A(1,1) & A(1,1) <= ((a(1,1) - 180) + 8)
               'interpretation opposition sun and sun'
elseif ((a(1,1) + 180) - 8) <= A(1,1) & A(1,1) <= ((a(1,1) + 180) + 8)
               'interpretation opposition sun and sun'
elseif ((a(1,1) - 120) - 6) <= A(1,1) & A(1,1) <= ((a(1,1) - 120) + 6)
               'interpretation trine sun and sun'
elseif ((a(1,1) + 120) - 6) <= A(1,1) & A(1,1) <= ((a(1,1) + 120) + 6)
               'interpretation trine sun and sun'
elseif ((a(1,1) - 240) - 6) <= A(1,1) & A(1,1) <= ((a(1,1) - 240) + 6)
               'interpretation trine sun and sun'
elseif ((a(1,1) + 240) - 6) <= A(1,1) & A(1,1) <= ((a(1,1) + 240) + 6)
               'interpretation trine sun and sun'
elseif ((a(1,1) - 90) - 6) <= A(1,1) & A(1,1) <= ((a(1,1) - 90) + 6)
               'interpretation square sun and sun'
elseif ((a(1,1) + 90) - 6) <= A(1,1) & A(1,1) <= ((a(1,1) + 90) + 6)
               'interpretation square sun and sun'
elseif ((a(1,1) - 270) - 6) <= A(1,1) & A(1,1) <= ((a(1,1) - 270) + 6)
               'interpretation square sun and sun'
elseif ((a(1,1) + 270) - 6) <= A(1,1) & A(1,1) <= ((a(1,1) + 270) + 6)
               'interpretation square sun and sun'
---etc for each aspect possible for a given birth date planet to horoscope date planet---
else
               'no aspect sun and sun'
end Repeat for each birth date planet to horoscope date planet possibility, I.e.:
if (a(1,2) - 8) <= A(1,1) & A(1,1) <= (a(1,2) + 8)   for a(1,1) thru a(1,10)
if (a(1,1) - 8) <= A(1,2) & A(1,2) <= (a(1,1) + 8)   for each A(1,1) thru A(1,10)
... ... a(1,n) respective A(1,N) for each n and N

Figure 6

```
if (a(1,1) - 8) <= A(1,1) & A(1,1) <= (a(1,1) + 8)
                    'interpretation conjunction sun and sun'
elseif ((a(1,1) - 180) - 8) <= A(1,1) & A(1,1) <= ((a(1,1) - 180) + 8)
                    'interpretation opposition sun and sun'
elseif ((a(1,1) + 180) - 8) <= A(1,1) & A(1,1) <= ((a(1,1) + 180) + 8)
                    'interpretation opposition sun and sun'
elseif ((a(1,1) - 120) - 6) <= A(1,1) & A(1,1) <= ((a(1,1) - 120) + 6)
                    'interpretation trine sun and sun'
elseif ((a(1,1) + 120) - 6) <= A(1,1) & A(1,1) <= ((a(1,1) + 120) + 6)
                    'interpretation trine sun and sun'
elseif ((a(1,1) - 240) - 6) <= A(1,1) & A(1,1) <= ((a(1,1) - 240) + 6)
                    'interpretation trine sun and sun'
elseif ((a(1,1) + 240) - 6) <= A(1,1) & A(1,1) <= ((a(1,1) + 240) + 6)
                    'interpretation trine sun and sun'
elseif ((a(1,1) - 90) - 6) <= A(1,1) & A(1,1) <= ((a(1,1) - 90) + 6)
                    'interpretation square sun and sun'
elseif ((a(1,1) + 90) - 6) <= A(1,1) & A(1,1) <= ((a(1,1) + 90) + 6)
                    'interpretation square sun and sun'
elseif ((a(1,1) - 270) - 6) <= A(1,1) & A(1,1) <= ((a(1,1) - 270) + 6)
                    'interpretation square sun and sun'
elseif ((a(1,1) + 270) - 6) <= A(1,1) & A(1,1) <= ((a(1,1) + 270) + 6)
                    'interpretation square sun and sun'
elseif ((a(1,1) - 150) - 4) <= A(1,1) & A(1,1) <= ((a(1,1) - 150) + 4)
                    'interpretation quincunx sun and sun'
elseif ((a(1,1) + 150) - 4) <= A(1,1) & A(1,1) <= ((a(1,1) + 150) + 4)
                    'interpretation quincunx sun and sun'
elseif ((a(1,1) + 150 - 360) - 4) <= A(1,1) & A(1,1) <= ((a(1,1) +150 - 360) + 4)
                    'interpretation quincunx sun and sun'
elseif ((a(1,1) - 60) - 2) <= A(1,1) & A(1,1) <= ((a(1,1) - 60) + 2)
                    'interpretation sextile sun and sun'
elseif ((a(1,1) + 60) - 2) <= A(1,1) & A(1,1) <= ((a(1,1) + 60) + 2)
                    'interpretation sextile sun and sun'
elseif ((a(1,1) + 60 - 360) - 2) <= A(1,1) & A(1,1) <= ((a(1,1) +60 - 360) + 2)
                    'interpretation sextile sun and sun'
elseif ((a(1,1) - 30) - 2) <= A(1,1) & A(1,1) <= ((a(1,1) - 30) + 2)
                    'interpretation semi-sextile sun and sun'
elseif ((a(1,1) + 30) - 2) <= A(1,1) & A(1,1) <= ((a(1,1) + 30) + 2)
                    'interpretation semi-sextile sun and sun'
elseif ((a(1,1) + 30 - 360) - 2) <= A(1,1) & A(1,1) <= ((a(1,1) +30 - 360) + 2)
                    'interpretation semi-sextile sun and sun'
else
                    'no aspect sun and sun'
end
```

Figure 6A

```
if (a(1,1) - 8) <= A(1,1) & A(1,1) <= (a(1,1) + 8)
                'Support for your endeavors by those in authority.'
elseif ((a(1,1) - 180) - 8) <= A(1,1) & A(1,1) <= ((a(1,1) - 180) + 8)
                'Keep silent about your plans and intentions.'
elseif ((a(1,1) + 180) - 8) <= A(1,1) & A(1,1) <= ((a(1,1) + 180) + 8)
                'Postpone meetings with governmental agencies.'
elseif ((a(1,1) - 120) - 6) <= A(1,1) & A(1,1) <= ((a(1,1) - 120) + 6)
                'Plans work smoothly.'
elseif ((a(1,1) + 120) - 6) <= A(1,1) & A(1,1) <= ((a(1,1) + 120) + 6)
                'Meetings go according to plan.'
elseif ((a(1,1) - 240) - 6) <= A(1,1) & A(1,1) <= ((a(1,1) - 240) + 6)
                'Important people agree with you.'
elseif ((a(1,1) + 240) - 6) <= A(1,1) & A(1,1) <= ((a(1,1) + 240) + 6)
                'A kindred spirit offers support.'
elseif ((a(1,1) - 90) - 6) <= A(1,1) & A(1,1) <= ((a(1,1) - 90) + 6)
                'Postpone meetings if needed.'
elseif ((a(1,1) + 90) - 6) <= A(1,1) & A(1,1) <= ((a(1,1) + 90) + 6)
                'Plans develop a glitch.'
elseif ((a(1,1) - 270) - 6) <= A(1,1) & A(1,1) <= ((a(1,1) - 270) + 6)
                'Your attitude may not be appreciated.'
elseif ((a(1,1) + 270) - 6) <= A(1,1) & A(1,1) <= ((a(1,1) + 270) + 6)
                'Tensions rise at the workplace.'
elseif ((a(1,1) - 150) - 4) <= A(1,1) & A(1,1) <= ((a(1,1) - 150) + 4)
                'Unexpected support from others.'
elseif ((a(1,1) + 150) - 4) <= A(1,1) & A(1,1) <= ((a(1,1) + 150) + 4)
                'Possible accidents or mishaps.'
elseif ((a(1,1) + 150 - 360) - 4) <= A(1,1) & A(1,1) <= ((a(1,1) +150 - 360) + 4)
                'Newcomers could be the real thing.'
elseif ((a(1,1) - 60) - 2) <= A(1,1) & A(1,1) <= ((a(1,1) - 60) + 2)
                'Enjoy the positive energy of others.'
elseif ((a(1,1) + 60) - 2) <= A(1,1) & A(1,1) <= ((a(1,1) + 60) + 2)
                'Gain from the input of others.'
elseif ((a(1,1) + 60 - 360) - 2) <= A(1,1) & A(1,1) <= ((a(1,1) +60 - 360) + 2)
                'Others seek out your opinion.'
elseif ((a(1,1) - 30) - 2) <= A(1,1) & A(1,1) <= ((a(1,1) - 30) + 2)
                'Temporary delays or snags.'
elseif ((a(1,1) + 30) - 2) <= A(1,1) & A(1,1) <= ((a(1,1) + 30) + 2)
                'Low energy, take it easy.'
elseif ((a(1,1) + 30 - 360) - 2) <= A(1,1) & A(1,1) <= ((a(1,1) +30 - 360) + 2)
                'Misunderstanding with coworkers.'
else
                ''
end
```

Figure 8

Birth Date Sun Aspected by Horoscope Date Sun

*Birth Date Sun Conjunction Horoscope Date Sun:*
Support for your endeavors by those in authority.

*Birth Date Sun Opposition Horoscope Date Sun:*
Keep silent about your plans and intentions.

*Birth Date Sun Trine Horoscope Date Sun:*
Plans work smoothly.

*Birth Date Sun Square Horoscope Date Sun:*
Postpone meetings if needed.

*Birth Date Sun Sextile Horoscope Date Sun:*
Enjoy the positive energy of others.

*Birth Date Sun Quincunx Horoscope Date Sun:*
Unexpected support from others.

*Birth Date Sun Semi-Sextile Horoscope Date Sun:*
Temporary delays or snags.

Birth Date Sun Aspected by Horoscope Date Sun

*Birth Date Sun Conjunction Horoscope Date Sun:*

Support for your endeavors by those in authority.
A day for public announcement of your plans.
A kindred spirit wants to help you.
Seek assistance from governmental agencies.
Evidence that your loyalty is appreciated.
The world is your stage.
Your energy and drive are in full gear.
Showcase your talents at this time.
Hold meetings with important people.
Approach people you wish to meet.
Employers will welcome your talents.
A good day for business pursuits.

Figure 9

| Birth Date | November 21, 1960 | | Horoscope Date | September 24, 1999 |
|---|---|---|---|---|
| Planet | Longitude in Degree | | Planet | Longitude in Degree |
| ☉ | 239° | | ☉ | 181° |
| ☿ | 220° | | ☿ | 193° |
| ♀ | 277° | | ♀ | 142° |
| ♂ | 109° | | ♂ | 254° |
| ♃ | 275° | | ♃ | 33° |
| ♄ | 285° | | ♄ | 46° |
| ♅ | 146° | | ♅ | 313° |
| ♆ | 220° | | ♆ | 302° |
| ♇ | 158° | | ♇ | 248° |
| ☽ | 273° | | ☽ | 348° |

| Planet Key: | Sun = ☉ | Mercury = ☿ | Venus = ♀ | Mars = ♂ | Jupiter = ♃ |
|---|---|---|---|---|---|
| | Saturn = ♄ | Uranus = ♅ | Neptune = ♆ | Pluto = ♇ | Moon = ☽ |

| Birth | | | | | | | | | | |
|---|---|---|---|---|---|---|---|---|---|---|
| ☉ | Sx | | | | Qu | | | | | |
| ☿ | | | | | | Op | Sq | | Ss | |
| ♀ | Sq | Sq | | | Tr | | | | Ss | |
| ♂ | | Sq | | | | | | | | Tr |
| ♃ | Sq | | | | Tr | | | | | |
| ♄ | | Sq | | Ss | | Tr | Ss | | | |
| ♅ | | | Cn | | | | | | | |
| ♆ | | | | | | Op | Sq | | Ss | |
| ♇ | | | | Sq | Tr | Tr | | | Sq | |
| ☽ | Sq | | | | Tr | | Ss | | | |
| | ☉ | ☿ | ♀ | ♂ | ♃ | ♄ | ♅ | ♆ | ♇ | ☽ | Horos |

| Aspect Key: | Conjunction = Cn | Opposition = Op | Trine = Tr | Square = Sq |
|---|---|---|---|---|
| | Quincunx = Qu | Sextile = Sx | Semi-Sextile = Ss | |

Figure 10

Enjoy the positive energy of others. Unexpected interest is taken in you. Discussions with the elderly produce discord. Travel may be hampered by miscommunication. You miss the subtle meaning in a message. You may attract a business competitor. Too much talk hinders romantic relationships. Your social life benefits from quality opportunities. Avoid any admirers with unknown pasts. Keep your own counsel on business and work matters. Invest time and energy in your domestic life. A new opportunity may not be a good move. Community involvement can be rewarding. Discussions with older people may produce disagreement. Your impractical pursuits are demeaned. Prudent handling of your finances will pay off. New information may not prove to be reliable. A spontaneous act may make your day romantically. Obligations may impede your desire for tranquillity. Be careful to avoid accidents around water. A stranger may upset your peace of mind. A competitor may seek your demise. A benefactor may come to your assistance. The law and law enforcement support you. An organization may mean to harm you. Your public duties may interfere with home life. Your home is a good location to explore pursuits. A loved one may be keeping a secret.

| For 11/21/1960 at 5:50 AM | Animal Sign | Degrees of 360 | Birth Planets |
|---|---|---|---|
| Horoscope Ascendant Field | Rabbit | 330° - 360/0° | none |
| Horoscope Ruling Field | Rat | 240° - 270° | none |

Enjoy the positive energy of others. Unexpected interest is taken in you. Discussions with the elderly produce discord. Travel may be hampered by miscommunication. You miss the subtle meaning in a message. You may attract a business competitor. Too much talk hinders romantic relationships. Your social life benefits from quality opportunities. Avoid any admirers with unknown pasts. Keep your own counsel on business and work matters. Invest time and energy in your domestic life. A new opportunity may not be a good move. Community involvement can be rewarding. Discussions with older people may produce disagreement. Your impractical pursuits are demeaned. Prudent handling of your finances will pay off. New information may not prove to be reliable.

Figure 12
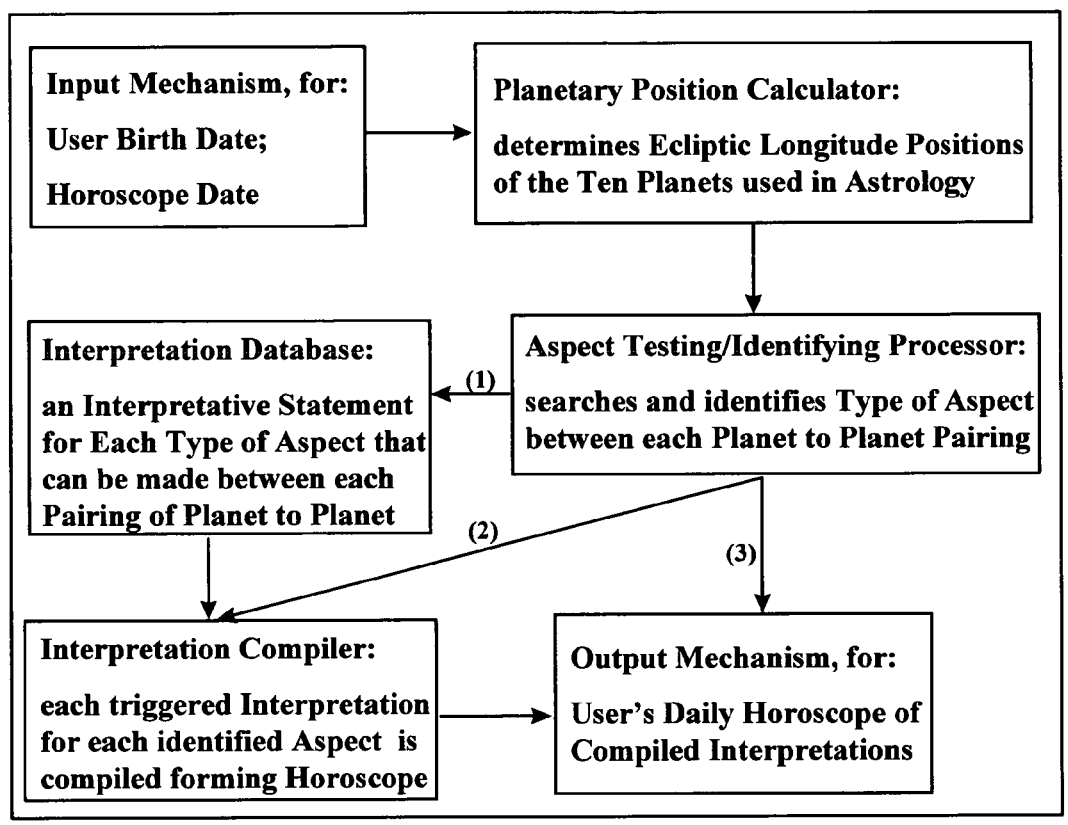
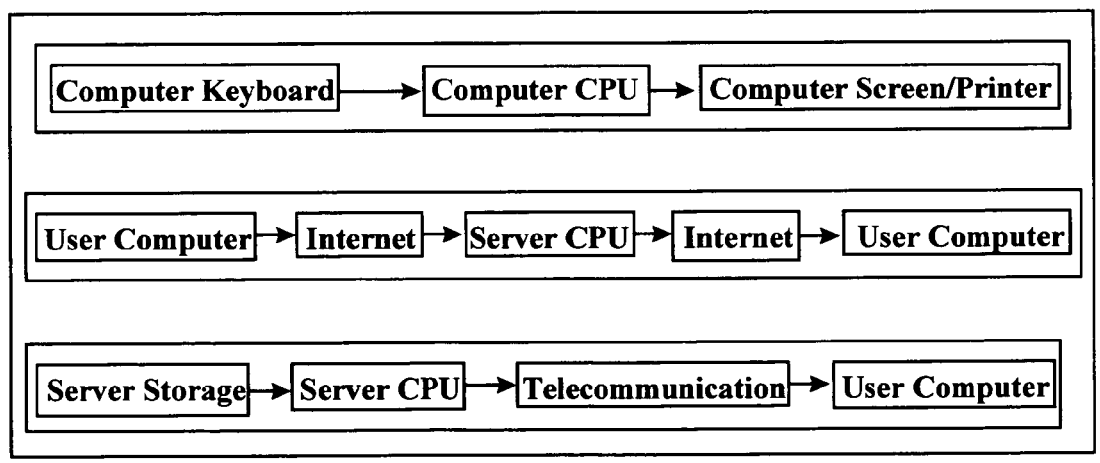

ASTROLOGICAL HOROSCOPES

MY RELATED U.S. APPLICATION DATA, MY PRIORITY PATENT APPLICATIONS

Division of application Ser. No. 11/013,275, filed on Dec. 15, 2004, now U.S. Pat. No. 7,083,415, which is a Division of application Ser. No. 10/671,415, filed on Sep. 25, 2003, now U.S. Pat. No. 6,974,325, which is a Division of application Ser. No. 09/849,582, filed on May 5, 2001, now U.S. Pat. No. 6,776,618, which is a continuation of application Ser. No. PCT/US00/28828, filed on Oct. 18, 2000, and a continuation of application Ser. No. 09/421,192, filed on Oct. 18, 1999, now abandoned, which is a continuation of application Ser. No. PCT/US98/13383, filed on Jun. 26, 1998, and a continuation of application Ser. No. 08/883,753, filed on Jun. 27, 1997, now abandoned, said application Ser. No. 09/849,582, filed on May 5, 2001.

Provisional Application No. 60/695,027, filed on Jun. 29, 2005, provisional Application No. 60/212,694, filed on Jun. 19, 2000, provisional Application No. 60/208,580, filed on Jun. 2, 2000, provisional Application No. 60/207,450, filed on May 30, 2000, provisional Application No. 60/207,415, filed on May 30, 2000, provisional Application No. 60/207,310, filed on May 30, 2000, provisional Application No. 60/206,603, filed on May 25, 2000, provisional Application No. 60/206,536, filed on May 21, 2000, provisional Application No. 60/205,290, filed on May 19, 2000, provisional Application No. 60/202,038, filed on May 5, 2000, provisional Application No. 60/189,332, filed on Mar. 14, 2000, provisional Application No. 60/181,502, filed on Feb. 10, 2000, provisional Application No. 60/172,651, filed on Dec. 20, 1999, provisional Application No. 60/158,065, filed on Oct. 7, 1999, provisional Application No. 60/144,056, filed on Jul. 16, 1999, provisional Application No. 60/040,442, filed on Mar. 12, 1997.

STATEMENT

The invention is neither a work for hire or Federally-sponsored.

BACKGROUND OF THE INVENTION

Popular in newspapers and on the internet, at web portals and dedicated web sites, are daily horoscopes. These horoscopes are written by a human author, wherein for each day, the author writes twelve different horoscopes, one for each of the twelve zodiac Sun signs (Aries, Taurus, Gemini, Cancer, Leo, Virgo, Libra, Scorpio, Sagittarius, Capricorn, Aquarius and Pisces). By doing so, that method, and its results, divide all people into one of twelve groups, wherein each person of a specific group (Sun sign) receives the exact same horoscope. Common sense states that, to provide each twelfth of the human population with the exact same horoscope, it can not accurately predict or render a unique and suitable horoscope for each and every individual.

Personalized astrology is based on the unique natal data of the individual, comprising the individual's birth date (day, month and year), birth place, and birth time. These are the input requirements for generating an individual's unique astrological data (the exact locations of the ten "planets" of astrology, which comprise the Sun, the eight non-Earth planets of the solar system, and the Earth's Moon), from which charts, tables and aspect grids for the individual can be accurately manufactured. Hence, a daily horoscope for each person should also be generated along these lines, using each person's unique birth input data.

BRIEF DESCRIPTION OF THE INVENTION

The invention builds a computational program, resident on a computer or electronic device, the results of which are displayed, or are sent automatically to subscriber/user e-mail addresses, or are accessible at a dedicated web site. The program generates, automatically and without human intervention, the unique and individualized daily horoscope for each subscriber/user, based on each user's specific birth data inputs. Each day's horoscope is generated for each subscriber each day.

The program takes each user's input of user's birth date, and parallel, the input of the horoscope date, and computes the planetary locations for user birth date and for horoscope date. These computations are made using complex mathematical and scientific algorithms which are available as public information. Then, the geometric relations (aspects) between the two sets of planetary data are determined, eg. using if/else type logic. Each determined relation (aspect) then calls to the database which stores the complete set of interpretative comments for each type of aspect between each possible planet to planet consideration. The appropriate interpretative comment for each applicable aspect is called and, together with all called applicable aspects, the horoscope comprises a set of compiled interpretative comments.

The method is extensible to non-computerized environments and application, wherein the manufacturing party manually renders the same set of results, using a printed-matter type database.

Three systems for processing and delivery are described.

BRIEF DESCRIPTION OF THE DRAWINGS

FIG. 3A shows each birth date planet respective each horoscope date planet for which the astrological aspects can be identified.

FIG. 4 specifies that the time convention requires conversion of birth date and horoscope date to julian dates for calculation of birth and horoscope date position sets, wherein using standard public-information astronomy ephemeris algorithms. FIG. 4 also specifies applicable lunar animal to time of birth.

FIG. 5 provides sample computational code determining aspects, calculated utilizing if/elseif/else type commands, to identify and trigger applicable interpretative remarks. Such code performs aspect determination for each birth planet to each horoscope planet, using aspect orbs to determine aspects made.

FIG. 6 shows sample code with orbs for each aspect type. FIG. 6A shows the sample code with operative interpretations.

FIG. 8 shows sample interpretations per aspect type.

FIG. 9 provides sample user and horoscope input, planetary position data, and aspects made between the position data sets.

FIG. 10 renders the horoscope generated for sample user.

FIG. 12 schematizes the functions of the software program and summarizes three computer-based horoscope delivery systems.

DETAILED DESCRIPTION OF THE PREFERRED EMBODIMENTS

The invention provides a functional and effective program that takes personal information and delivers a highly accurate and individualized daily horoscope—without human intervention.

Using highly individualized data, being the personally unique data of the user's birth date, of day, month and year, and of birth time, the program employs scientifically accurate determinations respective planetary placements, both for the birth data set and for the horoscope date, and employs innovative determination of astrological information, comprising the relevant aspects made between the planetary placements of the two data sets, the interpretations of the determined aspects, and the compilation of the interpretations, rendering a daily horoscope.

Because the invented method and consequent generator program rely on the fundament of planetary locations determined by their ecliptic positions to degree of 360, and not determined, or requiring to be determined, by any system of astrological sign, and utilize geometric aspects to trigger interpretations, this facilitates universal application across all astrological forms.

Truly, this method and program execute the most accurate and compelling means to achieve a personalized daily horoscope, for, as per *Webster's New Collegiate Dictionary* definition, astrology is "the divination of the supposed influences of the stars and planets on human affairs and terrestrial events by their positions and aspects". This focus is wholly and solely achieved.

Figure 1:
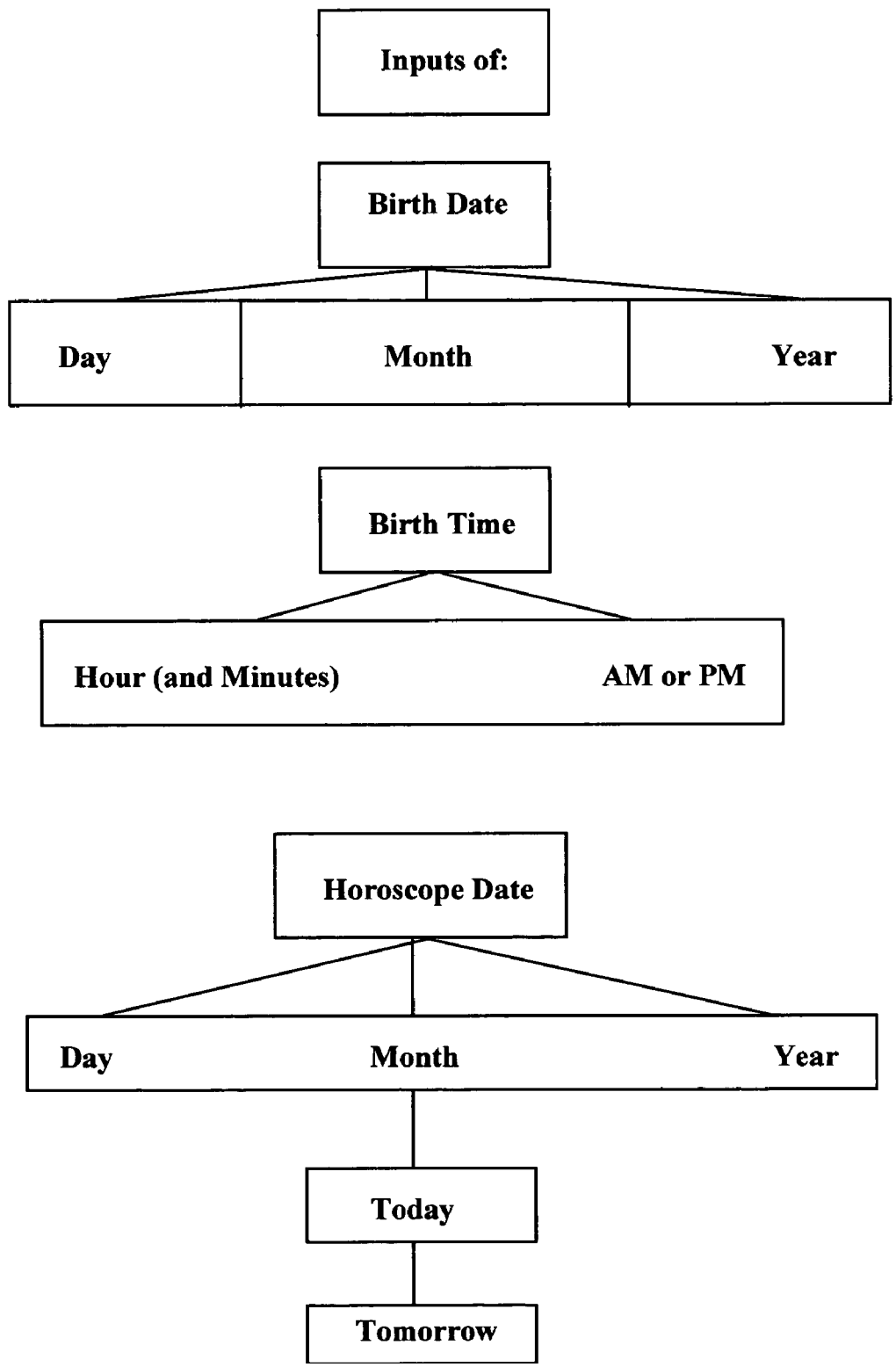
FIG. 1 delineates the two sets of parallel data inputs: the person's inputs of birth date, and the horoscope date, each comprising at a minimum the data of the day, month and year.

The invented daily horoscope generating method and program begin by establishing the inputs of the subscriber/user, which comprises the user's birth date, of day, month and year. As a secondary user input, the birth time, of hour and minutes, AM or PM, can be separately lodged. The input of the horoscope date is also established, comprising its day, month and year. As a secondary or alternative assignment, the horoscope date may be "today" or "tomorrow", or a date which can be selected by user. FIG. 1 details these cited inputs for user and horoscope data.

Figure 2:
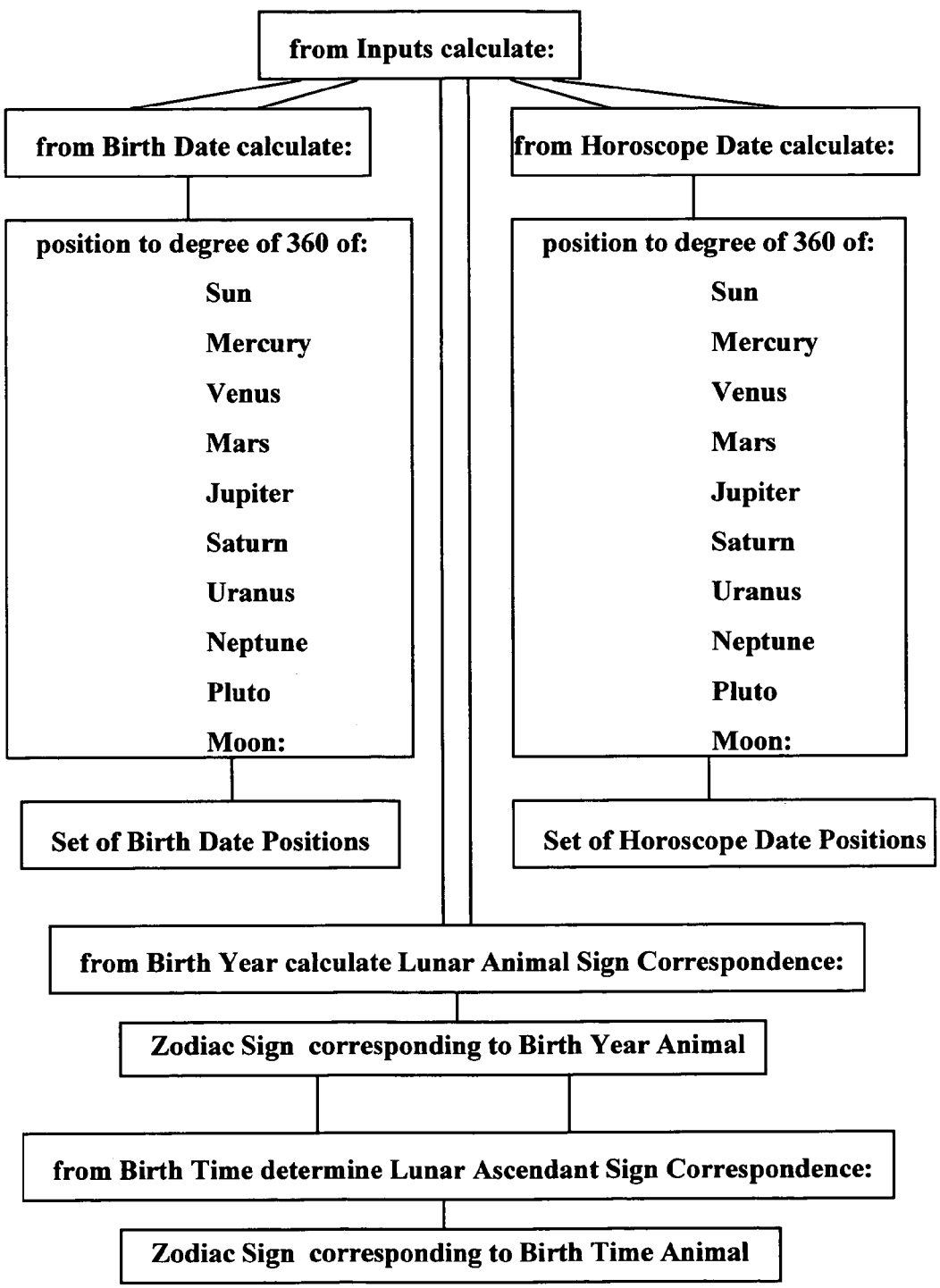
FIG. 2 schematizes the calculations made for each of the two input dates, wherein calculating, for each date, the position of the ten planets in celestial longitude to its degree of 360.

FIG. 2 details the calculations made directly to the data of user and horoscope dates. From the user birth date, the position, in ecliptic coordinates to its degree of 360 degrees, of each of the ten astrological planets, wherein comprising the Sun, the eight non-Earth planets, and the Earth's Moon, is determined, with the resultant planetary positions comprising the set of birth date positions. In a similar manner, the position of each of the ten astrological planets is determined from the horoscope date, with the resultant planetary positions comprising the set of horoscope date positions. These two sets are stored.

FIG. 2 also describes that, from the user's birth year, the lunar animal sign correspondence is determined, and further, the range of degrees of the ecliptic coordinate sphere corresponding to birth year animal is determined. Also, in FIG. 2, from the user's birth time is determined the corresponding lunar ascendant sign, and further, the range of degrees of the ecliptic coordinate sphere corresponding to the ascendant, birth time, animal is determined. These determinations are later used.

The next step of the invented method, and the calculations performed by the invented horoscope generator program, utilizes the set of birth date position data, and, respective the set of horoscope date position data, calculates, for each birth date planet respective each horoscope date planet, all aspects formed. At a minimum the aspects calculated are the group of conjunction (an aspect of equivalent degree, and an orb of about 8 degrees), opposition (a 180 degree separation, an orb of about 8 degrees), trine (a 120 degree separation, an orb of about 6 degrees), and square (a 90 degree separation, and an orb of about 6 degrees). The operator, "orb", indicates the range around the separation. If none of these aspects are made, then no aspect is determined.

Three further types of aspects can be calculated, the group of quincunx (a 150 degree separation, an orb of about 4 degrees), sextile (a 60 degree separation, an orb of about 2 degrees), and semi-sextile (a 30 degree separation, an orb of about 2 degrees). For completeness, all seven types of angular aspects are sought.

Figure 3:
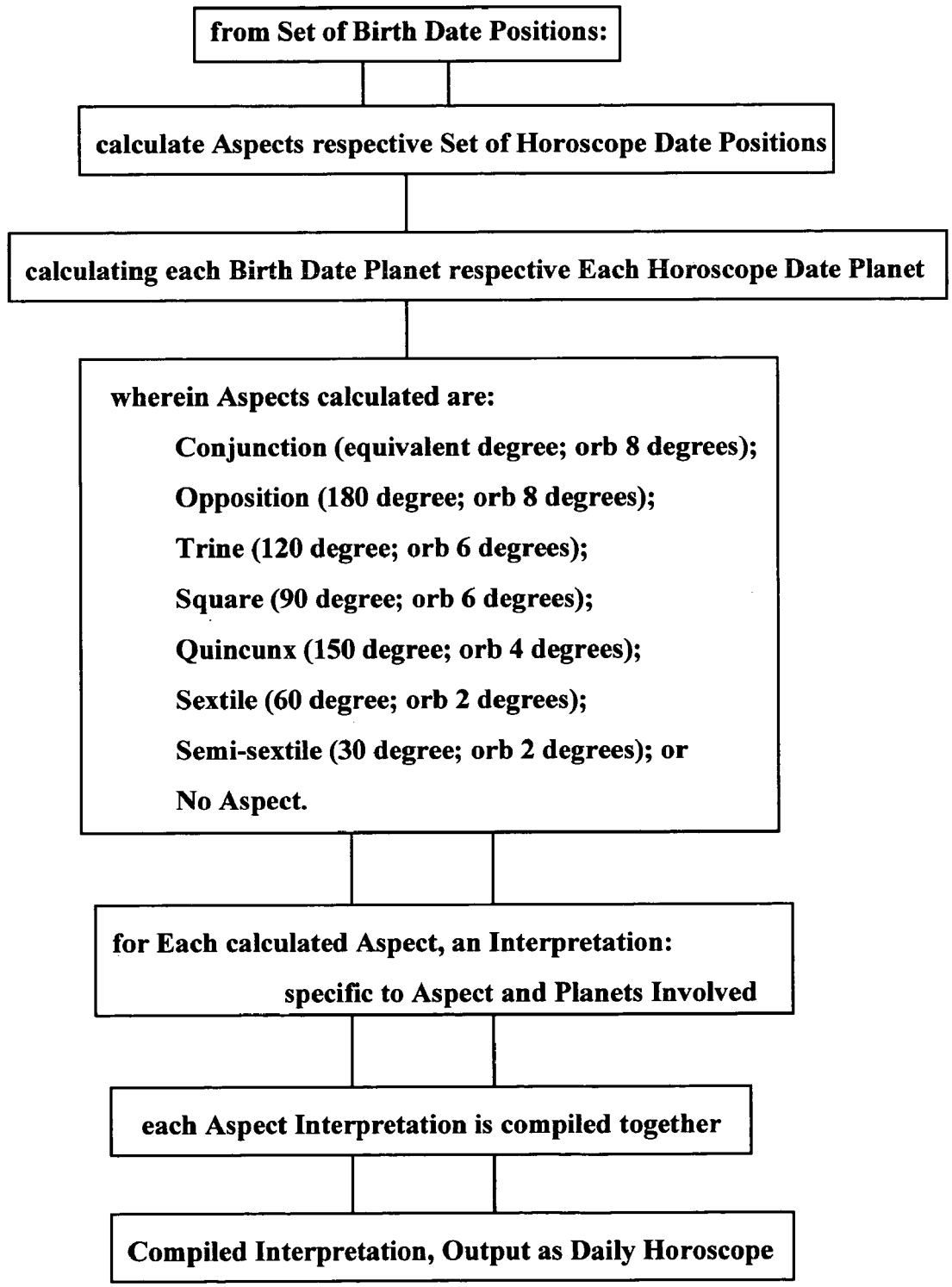
FIG. 3 delineates the determination of the aspects, made by the birth date positions to the horoscope date positions. For each aspect made, an interpretation, specific to aspect and planets involved, is called from database, compiling horoscope.

As described in FIG. 3, for each determined aspect, a specific and applicable interpretation is triggered, specific to the particular aspect and planets which are involved. Each such aspect interpretation is triggered, culled and compiled together, with the resultant compiled interpretation forming the output which comprises the daily horoscope for user and horoscope dates. FIG. 3A shows aspects searched by birth and horoscope planets.

FIG. 4 details specifics of the computations performed on the birth and horoscope dates. The time convention utilized is the julian calendar, and hence both user birth date and horoscope date are converted to their respective julian date, using common and standard practice. An ephemeris generating program, based on common and standard practices, is utilized to determine the planetary positions for each of the birth and horoscope dates. The positions are rendered in ecliptic coordinates of celestial longitude, and the date data sets contain the location of each of the ten planets in degrees longitude. The standard ecliptic system convention is to utilize a vernal equinox origin. The planet positions are calculated utilizing standard astronomy algorithms. Sources of public-information algorithms for the conversion of dates to julian dates, and to determine the ecliptic positions of planets are readily and publicly available, and include, but are not limited to, such available sources as:

"How to Compute Planetary Positions", by Paul Schlyter; and

"Computing Planetary Positions—a Tutorial with Worked Examples", by Paul Schlyter, at www.stjarnhimlen.se/comp.

FIG. 4 also provides the relations of each of the twelve lunar animal signs (Rat, Ox, Tiger, Rabbit, Dragon, Snake, Horse, Sheep, Monkey, Rooster, Dog, and Pig) to the corresponding birth year, to time of birth, to zodiac sign, and to degrees longitude. The zodiac sun sign correspondences represented therein are based on the set of correspondences that I, David Andrew D'Zmura, invented, and are contained in my U.S. Pat. No. 6,776,618, issued Aug. 17, 2004. Prior art correspondences could be utilized.

FIG. 5 provides sample computational code, wherein aspects are calculated utilizing if/elseif/else commands. FIG. 5 shows a functional set of coding to determine the aspects comprising the conjunction, opposition, trine and square. It utilizes two arrays of values representing the ten planetary positions for each of the birth date and horoscope date data sets, referenced in the sample code as arrays marked "A" and "a". The values in the arrays are for each planet's position in longitude to its degree of 360. Any ordering of the planets in the arrays could be utilized, however, herein the planet data is ordered, starting at the Sun, then the eight non-Earth planets in order proceeding from the Sun outward, and finally, the Earth's Moon. For each aspect tested, if applicable, a displayed interpretation of that aspect between the two planets is triggered. In the sample, dummy print is shown, simply registering the aspect which is existent. In the operative version, an actual applicable interpretation is displayed. The sample code repeats for each birth date planet to horoscope date planet possibility, with output upon finishing.

FIG. 6 displays the sample computational code for the complete set of possible aspects, wherein identifying any aspects of conjunction, opposition, trine, square, quincunx, sextile and semi-sextile. In both FIG. 5 and FIG. 6, the "else" closure, wherein no aspect is identified, of 'no aspect' is a dummy print, wherein in operative version, nothing is actually printed then. FIG. 6A shows the sample code with operative interpretations.

Figure 7:
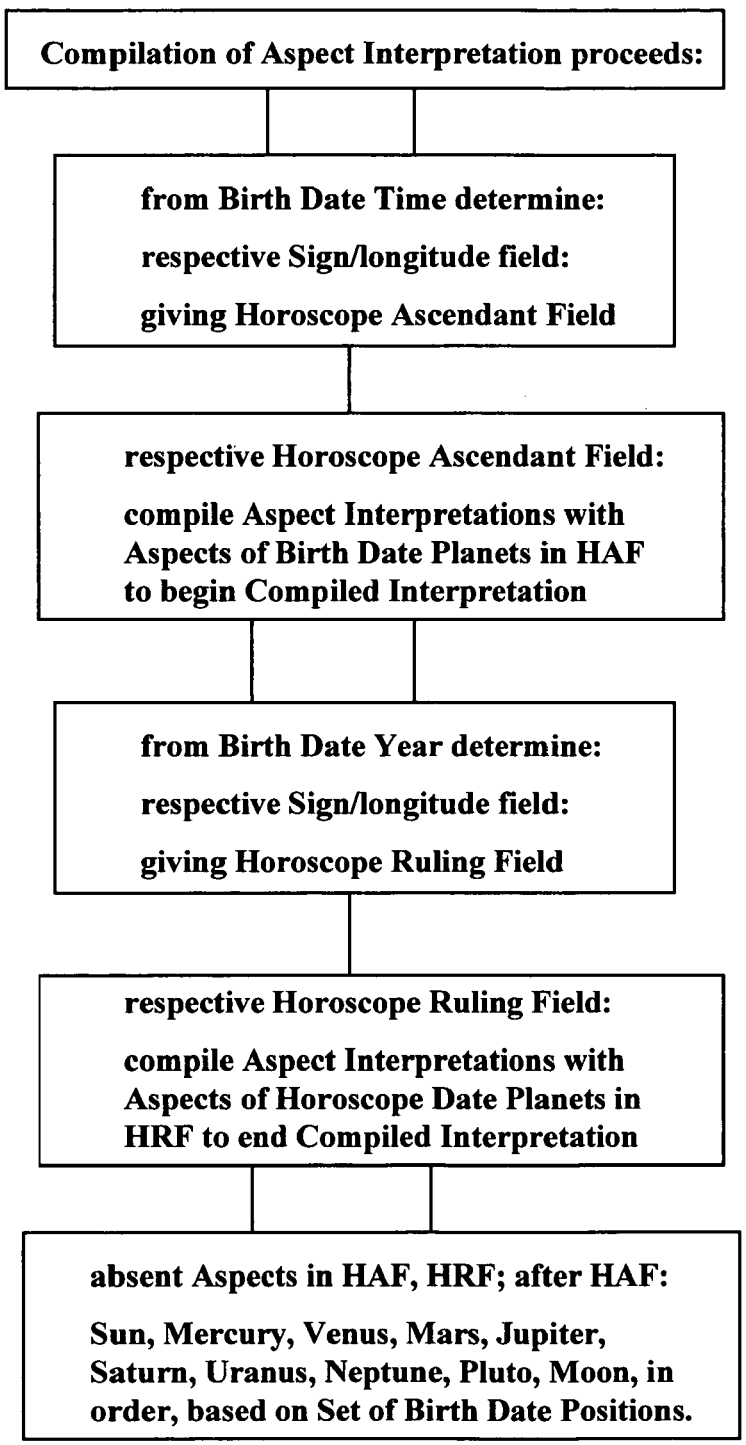
FIG. 7 details the compilation of aspect interpretations.

FIG. 7 displays the method in which the compilation of aspect interpretation proceeds. In its simplest form, the program and method simply compile the interpretations of aspects in the order in which they are generated. In the example ordering found in FIGS. 5 and 6, the aspect compilation begins at user's Sun, then user's eight non-Earth planets, and ends with user's Moon.

However, a more personalized compilation utilizes the user's birth date time to determine the respective lunar sign and its longitude field, yielding the user's horoscope ascendant field. Respective the horoscope ascendant field, the compilation of the aspect interpretations commences with the identified aspects of user's birth date planets in user's horoscope ascendant field.

Further, from the user's birth date year, the respective sign and longitude field is determined, yielding user's horoscope ruling field. Respective the horoscope ruling field, the compilation of the aspect interpretation concludes with the identified aspects of birth date planets in the horoscope ruling field. Should the two horoscope fields be identical, then the use and placement of the horoscope ascendant field is appropriate.

Absent of any aspects in the horoscope ascendant or ruling fields, and after any ascendant field aspect interpretations, the remaining aspect interpretations proceed, are compiled, in order starting with user's Sun, then user's eight non-Earth planets in order proceeding from the Sun, and user's Moon, based on and as determined by the user/subscriber's set of birth date positions.

FIG. 8 provides sample interpretations for the set of all possible searched aspects, herein, due to page length, being limited to, in top portion of FIG. 8, an interpretation for each of the seven aspect types (conjunction, opposition, trine, square, sextile, quincunx, and semi-sextile) respective the birth date (user's) Sun and the horoscope date Sun. The interpretations are based on the astrological significance or meaning related to the planets which are forming an aspect and the type of aspect. In FIG. 8, bottom portion, a set of multiple interpretations is provided for a single specific aspect between two specific planets. This format is useful to create variation and enhanced richness in the interpretation triggered, wherein, in the sample depicted, twelve possible interpretations are stored in database or on printed-matter sheets, of which only one will be selected at the trigger, with selection made by random selection process.

FIG. 9 depicts provision of intermediate determinations, being the data of planetary positions for an example birth date and for an example horoscope date, upper portion of FIG. 9, as well as the data of aspects which are determined and identified from these two sets of planetary data, lower portion of FIG. 9.

In FIG. 9, an example user, having a birth date of Nov. 21, 1960, with a birth time of 5:50 AM, is profiled by way of the positions of the ten planets at that date and time, in degrees longitude of 360, wherein using a vernal equinox origin. As determined by the calculation of planetary positions, by using standard astronomy ephemeris calculations, the example user has the Sun at 239 degrees, Mercury at 220 degrees, Venus at 277 degrees, Mars at 109 degrees, Jupiter at 275 degrees, Saturn at 285 degrees, Uranus 146 degrees, Neptune at 220 degrees, Pluto at 158 degrees, and the Moon at 273 degrees. The example horoscope date, being Sep. 24, 1999, is similarly profiled by planets.

Utilizing these two sets of planetary position data, all possible aspects are searched for, and the actual aspects being formed between the planets of these two data sets are identified, FIG. 9 bottom portion. The manner of aspect searching, herein used, finds horoscope planets making an aspect to birth planets. All identified aspects are registered to trigger interpretations.

FIG. 10, top portion, displays a generated daily horoscope for the example user on the example horoscope date. Each aspect that was identified, FIG. 9, triggered an applicable statement of astrological interpretation, being in each case, one sentence. The method of compilation of aspect interpretations, top portion FIG. 10, simply orders the interpretative statements by the user's birth planets, commencing at aspects interpretations of the user's Sun, then the user's eight non-Earth planets in order proceeding outwards from the Sun, and finally, the user's Moon.

FIG. 10, middle portion, provides the determined results of the horoscope ascendant field and the horoscope ruling field for the example user, born Nov. 21, 1960 at 5:50 AM. From FIG. 4, bottom portion, it is determined that the example user, born at 5:50 AM, has a horoscope ascendant field ruled by the animal sign of Rabbit, spanning 330 to 370 degrees longitude. Also, from FIG. 4, bottom portion, it is determined that the example user, born in the year 1960, has a horoscope ruling field ruled by the animal sign of Rat, spanning 240 to 270 degrees. However, because the example user does not have any birth planets in either the user's horoscope ascendant field or horoscope ruling field, the compilation of aspect interpretations is not altered from the ordering of statements, top portion FIG. 10.

There are means to adjusting or calibrating the amount of interpretative remarks which are generated per daily horoscope. For instance, the orb for each or any of the aspects can be adjusted to have a greater or lesser range, whereby increasing or decreasing the likelihood of determining aspects, respectively. Another manner is to use a random chance, e.g. one in two, to trigger a particular aspect interpretation where an aspect has indeed been identified. From an astrological perspective, this makes sense for slow moving aspects, i.e. for aspects formed by the horoscope date's "outer" planets (Uranus, Neptune, and Pluto) to the user's birth planets. Another manner, FIG. 10 bottom portion, ignores "outer" (a.k.a. "generational") birth planets, and limits aspects to the user's "personal" ("interior") planets.

Another factor which can affect the selection or application of which planets of the user's planet set to include, pertains to the fact that many people do not know the time they are born. While knowing one's birth date is sufficient to determine, with an accuracy of one degree longitude, the positions of the user's Sun and eight non-Earth planets, the birth date alone, without an accurate input of time of birth, cannot sufficiently determine the position of the user's Moon. The Moon moves through a zodiac Sign (about 30 degrees longitude) about every two days, with the result that a span of some 15 degrees occurs by the Moon's travel each day. Consequently, due to the limitations of many users' knowledge regarding their birth time, the use of the user's Moon in determining aspects may not be feasible in many instances. The minimum planets useable for the user's birth date for aspect identification can, or may, be limited to Sun, Mercury, Venus, Mars, Jupiter and Saturn, as shown in FIG. 10, bottom portion.

Figure 11:
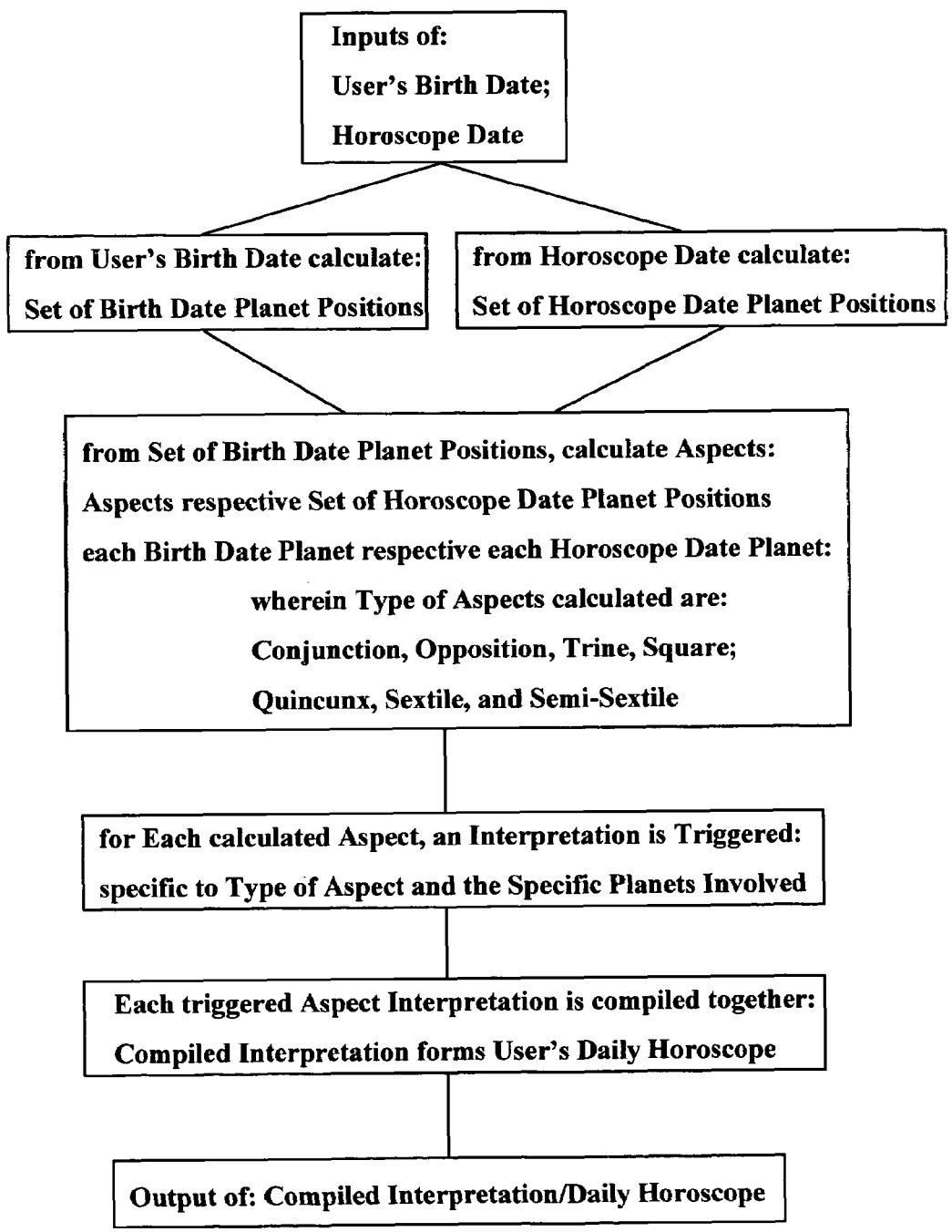
FIG. 11 summarizes the daily horoscope generating method.

FIG. 11 summarizes the daily horoscope generating method, which in turn, operates as a program's functional specification. The method's steps are:

taking inputs of a user's birth date and a horoscope date;

calculating the set of birth date planet positions from the user's birth date, and calculating the set of horoscope date planet positions from the horoscope date;

searching, determining and identifying the angular aspects, by type, which are made from each birth date planet with respect to each horoscope date planet, by calculating aspect formation;

triggering an interpretation for each determined aspect, specific to the type of aspect and specific planets involved;

compiling or collecting each triggered aspect interpretation into a compiled interpretation, forming user's daily horoscope;

rendering, printing or transmitting user's daily horoscope.

FIG. 12, top portion, schematizes a computer program for the generation of daily horoscopes. The program has means for input of the user's birth date and of the horoscope date. This may be entered by the user at prompt or delivered from database. These inputs are then utilized by planetary position calculating logic to determine the ecliptic longitude positions of the planets used in astrology for each of the two date inputs. The data sets of the planetary positions for each input date are then sent into processing to test for and determine each aspect (by aspect type) made between each possible planet to planet pairing, said pairing of a planet in user data set with a planet in the horoscope data set, wherein calculating all applicable aspects.

Should the processing of aspect determination be made by if/elseif/else type logic, it is possible to directly couple an interpretation to each type of aspect between each and every planet to planet consideration, by way of a print or send type command. The command effects the applicable interpretation (see FIGS. 5, 6, 6A). This procedure permits each and every triggered aspect interpretation to be collected (de facto compiled), and printed or rendered directly as output of user's daily horoscope. This means is featured in FIG. 12, top portion, by arrow (3).

It is also possible to have each identified aspect trigger its applicable interpretation from an interpretation database, wherein the identified aspect is linked to call its applicable interpretation, arrow (1). Such an interpretation database is depicted in basic form in FIG. 8, top portion. An advantage of using a dedicated database for the interpretations is shown by FIG. 8, bottom portion, wherein multiple applicable interpretations per each aspect type for each specific planet to planet pairing can be stored. A programming feature, which randomly selects from among the multiple interpretations per each applicable aspect, can be built onto the interpretation database.

Arrow (2) represents the path directly from the aspect testing/identifying processor to an interpretation compiler. The interpretation compiler is also reached via the interpretation database. The compiler's purpose is to collect and organize the group of all applicable interpretative statements. Per FIGS. 1, 2, 4, and 7, it can have compiling functionality which organizes the interpretative statements according to the user's birth time and birth year, which in turn, organizes interpretation according to the user's lunar animal ascendants (horoscope ascendant field) and to the user's lunar animal rulers (horoscope ruling field).

From either the interpretation compiler, or directly from the aspect identifying processor, the user's daily horoscope, which comprises the compiled set of applicable interpretations, is rendered as output. The program renders the output to computer screen or printer, or via the internet or by telecommunications.

FIG. 12, bottom portion, outlines three systems for the generation and delivery of a user's daily horoscope. The topmost schematic of the bottom portion outlines the system wherein the program is resident on the user's computer or hand-held device. From the keyboard or keypad, the user accesses the program, which is housed in storage, but operates on the computer/device's CPU. The output, the daily horoscope, is sent to its screen/printer.

The middle schematic of the bottom portion of FIG. 12 outlines the system wherein a user accesses the program, which is resident on a server computer, via internet or telecommunication. From the user's computer or hand-held device (such devices now comprise hand-held computers, messaging devices and cell phones), the user communicates to the server computer, with the server CPU operating the program and rendering the program's output back to the user computer/device via the internet or telecommunications.

The bottom schematic of the bottom portion of FIG. 12 outlines the system wherein the user/subscriber receives a daily horoscope automatically generated and delivered by the server computer to the user's computer/device. This system, which can be readily understood akin to the delivery of a daily newspaper, has the user/subscriber's birth information in the server computer's storage, as well as the user/subscriber's delivery coordinates (i.e. e-mail address or cell phone number, etc.), and each day, the server computer, housing the horoscope generating program, processes and sends user's daily horoscope to user's coordinate. David Andrew D'Zmura (pro-se independent inventor)

The invention claimed is:

1. A computer device housing, storing, or operating a computer program, said program for generating daily horoscopes, comprising:

means for fixing said program in a tangible component medium, said medium comprising a computer disk, memory, or storage drive;

means for entering inputs of a user's birth date and a horoscope date, wherein means for entering or recalling said user's birth date inputs, said user's birth date inputs comprising day, month, year and time, and wherein means for entering or recalling said horoscope date inputs, said horoscope date inputs comprising day, month and year;

means for calculating a set of birth date planet positions for said user's birth date, wherein said birth date planet positions comprise ecliptic longitude positions of the Sun, Mercury, Venus, Mars, Jupiter, Saturn, and Earth's Moon, at said user's birth date;

means for calculating a set of horoscope date planet positions for said horoscope date, wherein said horoscope date planet positions comprise ecliptic longitude positions of the Sun, Mercury, Venus, Mars, Jupiter, Saturn, and Earth's Moon, at said horoscope date;

means for determining and identifying angular aspects, by type, which are made from each birth date planet with respect to each horoscope date planet, by calculating aspect formation, wherein said angular, aspects comprise conjunction of equivalent degree, opposition of 180 degree separation, trine of 120 degree separation, and square of 90 degree separation, wherein said aspect formation calculates by using an orb, said orb a range in degrees around exact aspect form;

means for triggering an interpretation or remark for each determined aspect, said interpretation or remark specific to each type of aspect possible between each specific user planet and each specific horoscope planet, which further comprises means for storing or housing a set of relevant astrological interpretations or remarks;

means for compiling each triggered aspect interpretation or remark together, wherein compilation forms user's daily horoscope;

means for displaying, printing, or transmitting said user's horoscope, said horoscope comprising said computer program's output.

2. In the invention of claim 1, which further comprises means for coding, compiling and operating said computer program as a group of coded objects, wherein said coded objects perform specific tasks to said program as a whole, which further comprises means for:

an input mechanism, wherein said input mechanism comprises a desktop display prompt, an intra-program prompt to storage, or a prompt generated by an internet-enabled server, wherein said mechanism inputs said user's birth date and said horoscope date;

a planetary position calculator, wherein said position calculator determines ecliptic coordinate positions, for said sets of said user's birth date planets and of said horoscope date planets;

an aspect testing or identifying processor, wherein said processor searches, determines and identifies said angular aspects made between each birth date planet and each horoscope date planet;

an interpretation database, wherein said database houses an interpretation or remark relevant to each type of aspect possible between each specific user planet and each specific horoscope planet;

an interpretation compiler, wherein said compiler compiles each interpretation per each identified aspect as user's daily horoscope;

an output mechanism, wherein said output mechanism comprises executing to display, printout, or transmission of user's horoscope.

3. In the invention of claim 1, which further comprises means for hosting, running, or integrating said daily horoscope program within a networked computerized device, an internet-enabled server environment, or an automated, telephony-communicated, horoscope subscription service, which further comprises means for:

a keyboard and screen wired to a computer central processing unit, wherein means for running said computer program by said central processing unit, and wherein means for user input and program output;

a user's internet-enabled computer linked to an internet-enabled server, via wireless, cable, or telephone, wherein means for said server hosting or accessing said computer program, and wherein means for transmitting said computer program output to user's computer; or a digital or computer storage medium linked to an internet-or telecommunications-enabled server's central processing unit, wherein means for operating automatically said computer program by said enabled server's central processing unit, and wherein means for transmitting, sending or dispatching said computer program output to user's internet-enabled computer, email, or telecommunication device.

4. In the invention of claim 1, which further comprises means for including the outer planets in said sets of user's and horoscope planets, wherein said outer planets comprise Uranus, Neptune and Pluto, which further comprises means for including additional angular aspects comprising quincunx of 150 degree separation, sextile of 60 degree separation, and semi-sextile of 30 degree separation, or which further comprises means for including user zodiac or lunar ascendant.

* * * * *